US010061061B2

(12) United States Patent
Ziauddin et al.

(10) Patent No.: US 10,061,061 B2
(45) Date of Patent: Aug. 28, 2018

(54) WELL TREATMENT WITH DIGITAL CORE ANALYSIS

(71) Applicant: Schlumberger Technology Corporation, Sugar Land, TX (US)

(72) Inventors: Murtaza Ziauddin, Katy, TX (US); Denis Klemin, Houston, TX (US); Mark Andersen, Houston, TX (US); Alexander Nadeev, Spring, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 982 days.

(21) Appl. No.: 14/444,618

(22) Filed: Jul. 28, 2014

(65) Prior Publication Data

US 2016/0025895 A1 Jan. 28, 2016

(51) Int. Cl.
*G06F 19/00* (2018.01)
*G01V 1/40* (2006.01)
*G01V 3/18* (2006.01)
*G01V 5/04* (2006.01)
*G01V 9/00* (2006.01)
*G01V 99/00* (2009.01)
*E21B 41/00* (2006.01)
(Continued)

(52) U.S. Cl.
CPC ............ *G01V 99/005* (2013.01); *E21B 41/00* (2013.01); *E21B 43/25* (2013.01); *E21B 49/02* (2013.01)

(58) Field of Classification Search
CPC .......... E21B 41/00; E21B 43/25; E21B 49/02; G01V 99/005
See application file for complete search history.

(56) References Cited

U.S. PATENT DOCUMENTS

| 7,561,998 B2 * | 7/2009 | Panga | E21B 43/16 |
| | | | 166/281 |
| 9,709,477 B2 * | 7/2017 | Chertov | G01N 15/082 |
| 9,709,478 B2 * | 7/2017 | Chertov | G01N 15/082 |

(Continued)

FOREIGN PATENT DOCUMENTS

| WO | 2012031161 A1 | 3/2012 |
| WO | 2012082273 A1 | 6/2012 |

OTHER PUBLICATIONS

"Investigating the Effects of Core Length . . . "; thesis by Nour, Mohamed Hashim; May 2014.*

(Continued)

*Primary Examiner* — David M Gray
*Assistant Examiner* — Geoffrey T Evans
(74) *Attorney, Agent, or Firm* — Michael L. Flynn; Rachel E. Greene; Robin Nava

(57) ABSTRACT

Methods of well treatment include modeling approaches that account for the effect of pore structure during well stimulation treatments. In one aspect, methods may include preparing a computer model of a porous medium; simulating an injection of a fluid into the computer model of the porous medium; measuring a pore-scale heterogeneity of the computer model of the porous medium, and designing a stimulating fluid treatment for the porous medium. Other aspects may include the development of a wellbore stimulation methodology that allows stimulation fluid breakthrough curves of differing formation samples to be plotted as a single curve that accounts for the varied pore structure of the respective samples.

18 Claims, 9 Drawing Sheets

(51) Int. Cl.
  *E21B 43/25* (2006.01)
  *E21B 49/02* (2006.01)

(56) References Cited

U.S. PATENT DOCUMENTS

| | | | |
|---|---|---|---|
| 9,746,410 B2* | 8/2017 | Chertov | G01N 15/082 |
| 2006/0184346 A1* | 8/2006 | Panga | E21B 43/16 |
| | | | 703/9 |
| 2008/0234988 A1* | 9/2008 | Chen | G01V 11/00 |
| | | | 703/1 |
| 2009/0119082 A1 | 5/2009 | Fitzpatrick et al. | |
| 2010/0250216 A1 | 9/2010 | Narr et al. | |
| 2011/0082678 A1* | 4/2011 | Algive | G06F 17/5018 |
| | | | 703/12 |
| 2012/0158380 A1 | 6/2012 | Hajibeygi et al. | |
| 2016/0076369 A1* | 3/2016 | Ziauddin | C09K 8/60 |
| | | | 166/250.12 |

OTHER PUBLICATIONS

Dong, et al., "Acid Penetration in Natural Fracture Networks", Society of Petroleum Engineers, SPE-78791-PA, vol. 17, Issue 3, 2002, pp. 160-170.
Zakaria, et al., "Predicting the Performance of the Acid Stimulation Treatments in Carbonate Reservoirs using Non-Destructive Tracer Tests", SPE International Symposium and Exhibition on Formation Damage Control, Lafayette, USA, Feb. 26-28, 2013, pp. 1-27.
Examination Report issued in GCC Patent Application No. GC 2015-29797 dated Feb. 28, 2018; 4 pages.

* cited by examiner

WELL TREATMENT WITH DIGITAL CORE ANALYSIS

BACKGROUND

The statements in this section merely provide background information related to the present disclosure and may not constitute prior art.

Wellbore stimulation is a method that may be used to enhance the production of hydrocarbons from oil or gas wells traversing subterranean reservoirs by removing near-wellbore formation damage or by creating alternate flow paths through the formation. Stimulation operations often involve injecting a stimulation fluid into an isolated treatment zone at pressures below the fracture pressure of the formation. In some instances, the injected fluid may extend the effective wellbore drainage radius by dissolving formation rock to form channels such as wormholes or remove formation damage induced during drilling operations. The purpose of such stimulation techniques is often to increase the production rate by increasing the near borehole equivalent permeability.

Wellbore stimulation methods may include hydraulic fracturing, acidizing, or a combination of both called acid fracturing. In hydraulic fracturing, the stimulation fluid may be referred to as fracturing fluid, while fluids used in acidizing the latter may be referred to as an acidizing fluid or simply as acid. In hydraulic fracturing, a fluid is pumped from the surface into a wellbore at a pressure and rate sufficient to open fractures in the rock. During acidizing treatments, the acid or acid mixture is injected from the surface into the reservoir to dissolve materials that impair well production or to open channels or wormholes in the formation. When combining both methods, it is the role of the acid to etch away from the surface of the fractures to prevent them from closing completely once the pumping pressure is released.

However, while stimulation treatments may be used to enhance the well productivity by creating alternative flow paths through isolated regions of the formation, computer modeling of flow path formation may be hindered by unaccounted for reservoir properties. For example, properties such as the pore-scale heterogeneity of carbonates may have significant effects on the movement of injected stimulation fluids into the formation as alternative flow paths are created.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments described herein are directed to methods that may include preparing a computer model of a porous medium; simulating an injection of a fluid into the computer model of the porous medium; measuring a pore-scale heterogeneity of the computer model of the porous medium; and designing a stimulating fluid treatment for the porous medium.

In another aspect, embodiments described herein are directed methods that may include obtaining a sample from a formation to be treated; preparing a computer model of the sample; simulating the injection of a fluid into the computer model of the sample; measuring the pore-scale heterogeneity of the sample; estimating a pore volume to breakthrough for the sample; and designing a stimulating fluid treatment for the formation based on the results obtained from the determination of the pore-scale heterogeneity.

Other aspects and advantages of the embodiments disclosed herein will be apparent from the following description and the appended claims.

DESCRIPTION OF DRAWINGS

These and other features and advantages will be better understood by reference to the following detailed description when considered in conjunction with the accompanying drawings.

DETAILED DESCRIPTION

Figure 1:
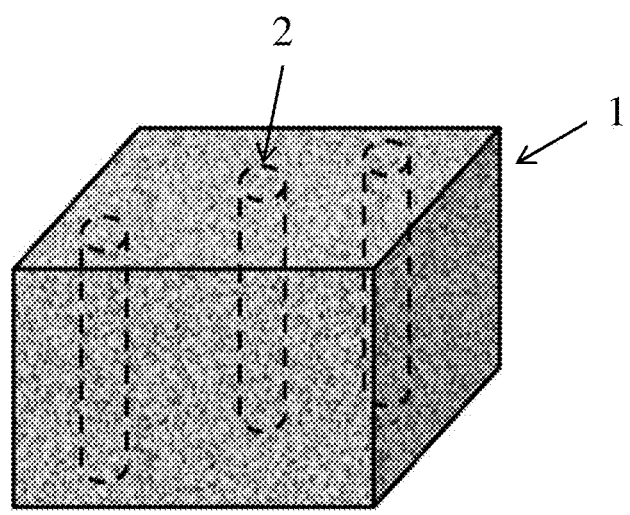
FIG. 1 is a graphical representation of the removal of cores from a section of rock.

For the purposes of promoting an understanding of the principles of the disclosure, reference will now be made to some illustrative embodiments of the current application. Like reference numerals used herein refer to like parts in the various drawings. Reference numerals without suffixed letters refer to the part(s) in general; reference numerals with suffixed letters refer to a specific one of the parts.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

As used herein, the terms "treatment fluid" or "wellbore treatment fluid" are inclusive of "fracturing fluid" or "stimulating treatment" and should be understood broadly. These may be or include a liquid, a solid, a gas, and combinations thereof, as will be appreciated by those skilled in the art. A treatment fluid may take the form of a solution, an emulsion, slurry, or any other form as will be appreciated by those skilled in the art. It should be understood that, although a substantial portion of the following detailed description may be provided in the context of oilfield hydraulic fracturing operations, other oilfield operations such as cementing, gravel packing, etc., or even non-oilfield well treatment operations, can utilize and benefit as well from the disclosure of the present methods of formation treatment.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

In one or more embodiments, methods in accordance with the present disclosure may include generating microscale models of porous media representing pore and grain geometry, simulating the injection of a non-reactive fluid through a porous medium using a microhydrodynamical modeling (or other micromodels for flow-dynamic behavior), and determining a flowing fraction for the porous medium.

In preparation for wellbore stimulation operations, the amount of stimulating fluid needed to treat a given formation may be determined from the pore volume to breakthrough (PVBT) for the selected stimulating fluid. PVBT is defined as the ratio of the volume of fluid injected to achieve channel breakthrough of the volume of the pore space in the core. However, PVBT measurements with reactive stimulating fluids are destructive, and when assaying to determining optimal injection pressure, concentration, and fluid type, for example, numerous formation samples may be required to develop a comprehensive set of PVBT curves.

For samples having heterogeneous pore sizes and connectivity, flow capacity (the total volumetric flow for a given flow path) may be higher relative to the storage capacity (the total volumetric flow for the total sample volume), which can indicate a reduced flowing fraction (f) due to the lack of pore connectivity through a given sample. The reduced flowing fraction may affect stimulating treatments in a number of ways. For example, in samples with poor connectivity, the reduced access of stimulating treatments to these regions of the formation may mean that stimulating treatments pass more quickly through a given formation when compared formations having well connected and homogenous porosity, with the end result that stimulation of the formation is incomplete and targeted hydrocarbon bearing regions are bypassed or inadequately stimulated.

The flowing fraction determined in accordance with the present disclosure is the fraction of the sample containing interconnected pore space that participates in fluid transport of flowing media, as opposed to the unconnected pore space or "dead-end" pore space. As will be shown, the flowing fraction may be correlated with the PVBT for a porous sample and used to estimate a number of useful factors for preparing stimulation treatments, including selection of the type and concentration of stimulating fluid, and estimating the appropriate injection pressure and volume for treatment.

Computer simulations may be used in industrial applications to model processes and predict behaviors. A common example in the oil industry is the use of reservoir flow models to predict well productivity. The scale of a reservoir model can be from a few meters to hundreds of meters thick and can be thousands of meters in lateral extent. The volume elements in these models may be on the order of meters or tens of meters on a side and, because of the scale, such models may not efficient account for the effect of pore-scale heterogeneity on wormhole dissolution pattern and the acid pore volumes required to breakthrough (PVBT).

On the smaller scale, micromodels of porous media represent small sections of the media, often with volume elements on the order of a few microns (such as 5 microns) for microCT or less (e.g., 100 times smaller for SEM imaging) on a side and full models that are on the order of centimeters and millimeters or less in extent. Static micromodels representing pore and grain geometry can be obtained in several ways and at different scales.

In one example, thin sections of rocks, often containing injected dyes or epoxies, may be analyzed to obtain images of the pores and grains. Multiple thin sections can be used to create a micromodel, often using statistical distributions rather than making an image directly from stacked thin sections. In a second example, a small rock volume can be scanned using X-rays in a microscopic computer tomography (microCT) machine. The tomographic inversion of the X-ray scans is used to create a static model of a rock with resolution ranging from tens of microns to tens of nanometers. This CT image is processed and segmented into grains and pores. Yet another method may include using ion beam milling and scanning electron microscopy to create a series of images with nanometer-scale resolution. These images can be analyzed and used to construct a static 3D model of a tiny portion of the rock.

Micromodels for flow-dynamic behavior in porous media include several types of modeling conventions. Pore network models substitute a complex network of nodes and connectors to represent the pores and pore throats, respectively. The network is based on a static representation rock model, and flow dynamics are applied to the pore network. Lattice Boltzmann models are based on movement of particles on a three-dimensional grid, which can be placed within a static rock model. A third possible model may include microhydrodynamical modeling in a static rock model to represent simple or complex fluid-fluid and fluid-rock interactions during flow or while a chemical process develops.

Non-Destructive Methods of Modeling the Flow of Fluids Through a Porous Medium

In one or more embodiments, stimulation operations may be designed using predictions of reactive flows by generating micromodels of porous media that account for pore and grain geometry, simulating the injection of a reactive or non-reactive fluid through a porous medium using a microhydrodynamical modeling (or other micromodels for flow-dynamic behavior), and correlating the flowing fraction to the pore volume to breakthrough. The information can then be used to generate an adjusted PVBT curve that may provide guidance with respect to determining the type of stimulating fluid, concentration, and pressure of injection to treat a formation.

The terms "digital rock model," "digital model," "rock model," "micromodel," or simply "model," as used in this application, refer to pore and grain level models of a porous medium. In one or more embodiments, digital rock models in accordance with the present disclosure may use various types of input, such as a three dimensional earth model, information about formation pressures, wellbore, stress, pore pressure, type of rock, and/or other information or a combination thereof.

In one or more embodiments, digital rock models may contain pore-scale information derived from a sample of porous medium or formation having a resolution in the range of a few microns or less. Digital models in accordance with the present disclosure may also simulate the flow of fluids through a digital representation of the pore structure of a porous medium and may account for a number of variable parameters such as fluid density, solid content, the presence of multiple phases, rheology, and chemical interaction (e.g., hydrogen bonding or Van der Waals forces) with the surrounding pore matrix. Modeled flow processes may represent the flow of fluids, gases, or combinations thereof, that are native to a rock formation or injected.

Computer systems useful in performing the methods of the present disclosure may be virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments.

The terms "digital core analysis" or "DCA," as used in this application, refer to using the digital rock model and mathematical model of the subterranean fluids (which may be referred to as digital fluid model) to simulate a core flood experiment or laboratory test that is applied to a core sample. For example, simulations may be designed to replicate core flood experiments that include injecting fluid into a core sample according to a laboratory test procedure to obtain measurements (laboratory test results or simply laboratory results) of the core sample.

The DCA tools may include software instructions stored in a memory and executing on a computer processor to communicate with the surface unit for receiving data (e.g., the 3D porous solid image) and for managing (e.g., analyze, model, control, optimize, or perform other management tasks) the above described field operations based on the received data.

In one or more embodiments, DCA may be used to generate a digital rock model and a digital fluid model. In one or more embodiments, digital models generated from DCA may include digital rock models produced from 3D porous solid image of a core sample. The 3D porous solid image is a 3D digital representation of the core sample that is generated using sample information obtained from a number of possible measuring techniques that generate pore-scale information about a given sample including computed tomography (CT), scanning electron microscopy, focused ion beam scanning electron microscopy, confocal microscopy, or other suitable scanning techniques known in the art. Specifically, the 3D porous solid image is an image of each portion of the core sample including pores and solid surfaces. Thus, the 3D porous solid image may show pores and rock boundaries of the core sample for each layer of the core sample. In accordance with one or more embodiments, the 3D porous solid image may be obtained with or without destroying the core sample in the process, or compiled from data gathered from a wellbore tool inserted into a wellbore within a subterranean formation.

While the 3D porous solid image may show the physical structure of the core sample, the digital rock model may also include the lithology of the core sample. For example, the lithographic properties of the core sample may include pore size distribution, rock type, tortuosity measurements, statistical results generated from the properties, and other information. To generate the digital rock model, digital processing and morphological analysis of the 3D porous solid image may be performed. Specifically, consecutive application of image filtering, segmentation and multiple property recognition may be used to obtain the digital rock model from the 3D porous solid image. Morphological and geometrical statistical property analysis may further be performed to obtain information, such as pore size distribution, local and average tortuosity measurement, grain size distribution, and other properties that can be comprised to evaluate pore-scale heterogeneity of the core sample. In one of the embodiments 3D porous solid images and digital rock model analysis can be used to provide description of the types of porosity, pore connectivity, fabric and texture.

As mentioned above, in one or more embodiments, digital rock models may be prepared from data obtained from a wellbore traversing a subterranean formation such as from a downhole tool or other instrument capable of generating a continuous well log. Hardware sensors, core sampling, and well logging techniques may be used to collect data. Other static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, the drilling tool and/or a wireline tool. Well logs useful in accordance with the present disclosure include any log that may be used to quantify or describe the pore-scale heterogeneity of a formation including, but not limited to nuclear magnetic resonance (NMR) logs of T2 response, formation micro-image logs, scanning electron microscopy logs, sonic logs, neutron logs, resistivity logs, gamma logs, and spontaneous potential logs.

In one or more embodiments, the digital model generator generates the digital fluid model based on the phase behavior data of subterranean fluids of the formation. For example, the subterranean fluids may be extracted from a core sample and may be native to the rock formation or previously injected into the rock formation. In particular, the phase behavior data represent measured properties of the subterranean fluids. For example, the phase behavior data may be obtained from laboratory fluid characterization based on the specific protocols complemented by the workflows for laboratory data processing.

Laboratory fluid measurements may include different measurements techniques, laboratory equipment and operating protocols to measure properties that include but not limited with the following:

(i) Pressure/volume/temperature (PVT) behavior in a multiphase system, such as a two-phase compositional system (e.g., gas-oil system, oil-water-solvent system, etc.), a three-phase compositional systems (e.g., gas-water-hydrate system, water-oil-microemulsion system, etc.), etc.; (ii) Fluid-fluid and fluid-solid surface phenomena, such as IFT (i.e., interfacial tension), surfactants, adsorption, wetting angles, etc.;

(iii) Rheological properties, such as shear and volume viscosity, non-linear viscous effects, viscoelasticity, viscoplasticity, etc.

Table 1 below lists example laboratory analyses that may be performed to generate these measured properties that are saved in the data repository as the phase behavior data.

TABLE 1

| Standard PVT Tests | Solvent/Gas Studies | Chemical/Polymer Studies |
|---|---|---|
| Composition, molecular weight and density | Swelling test (P-x Diagram) | Surfactant/brine/ oil phase behavior studies |
| Multiple and single stage flash data (separator tests) | Single contact VLE experiments including phase compositions and physical properties | Interfacial tension measurements |
| Density, compressibility and viscosity measurements | Forward and backward multi-contact experiments | Rheological measurements |
| Constant composition expansion | Slimtube, rising bubble or other developed miscibility tests | Density and compressibility measurements |
| Constant volume depletion | Density, compressibility and viscosity measurements | — |
| Differential liberation | Interfacial tension measurements | — |

In one or more embodiments, the digital fluid model may be an EOS model or a Helmholtz free energy model described above.

In embodiments of the present disclosure, the digital model may be used to simulate the flow of reactive stimulating fluids through a porous medium. While other embodiments, the digital model may be used to simulate the flow of non-reactive fluids through a porous medium. In yet other embodiments, the digital model may be used to simulate the flow of a fluid or gas containing other active or inactive additives such as rheology modifiers or tracer molecules.

In one or more embodiments, methods may include generating a digital rock model of a core sample describing the physical pore structure of the core sample, and generating a digital model of an injectable medium such as fluid or gas, taking into account all of the relevant physical properties of the medium. Once the elements are modeled a computer program may generate a digital core analysis (DCA) to simulate injection of the fluid or gas into the porous medium, and in some embodiments, quantify the measure of pore-scale heterogeneity, taking into account, for example, the size distribution of the pores, pore throat size, and connectivity of the pores. In particular embodiments, the description of the pore-scale heterogeneity may be used to derive a flowing fraction, a factor that may be useful in describing the flow of fluids or gases through a porous medium by accounting for the portion of the pore space that is "dead end" or isolated from the connected pore fraction. With the pore-scale heterogeneity of the porous medium may be correlated with the PVBT and used to estimate a number of useful factors for preparing stimulation treatments, including selection of the type and concentration of stimulating fluid, and estimating the appropriate injection pressure and volume for treatment.

In other embodiments, DCA may be used to generate a 3D distribution of the flowing fluid phases and components to study the heterogeneity of the rock sample.

In yet other embodiments, DCA may be used to simulate the injection of a stimulating fluid through a porous medium using the microhydrodynamical modeling; then, by comparison of simulations of different microhydrodynamical simulations, design a stimulating treatment by selecting an optimal type of stimulating fluid, its concentration, and its pressure of injection.

In some embodiments, methods in accordance with the present disclosure may be performed as follows. A large block 1 sample from the rock of interest may be collected as apparent from FIG. 1. In said block, some cores 2 are extracted. These cores are then used to study the effect of pore-scale heterogeneity on carbonate stimulation treatments; accordingly, measurements such as X-ray fluorescence analysis may conducted to show elemental composition of the carbonate rock types used.

Figure 2:
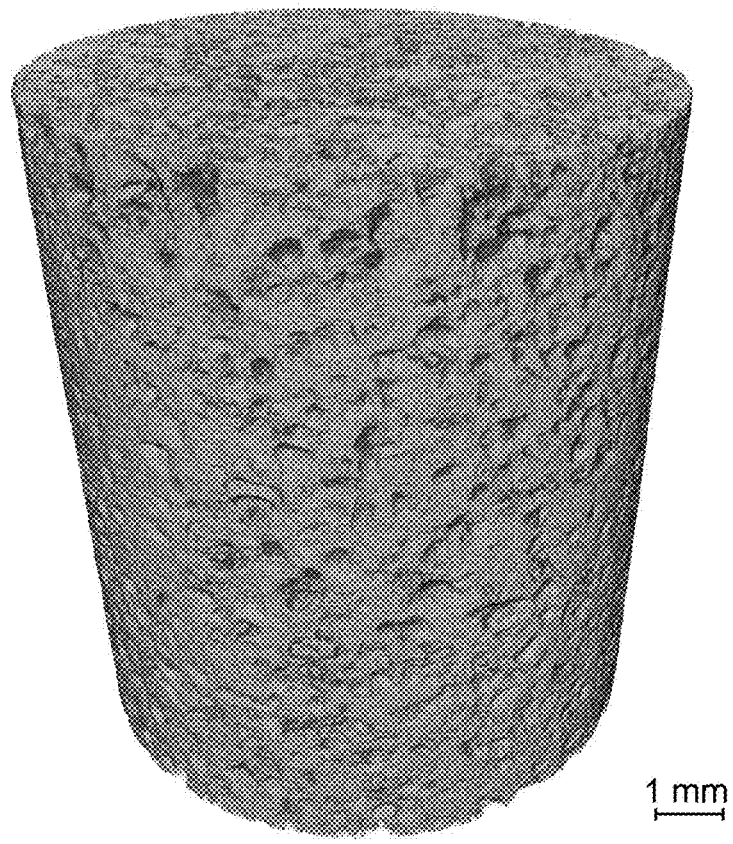
FIG. 2 illustrates an embodiment of the present disclosure in which a 3D model of the core sample generated using computed tomography (CT).

With particular respect to FIG. 2, the digital rock model may be generated using a 3D porous solid image of a core sample. The 3D porous solid image is a 3D digital representation of the core sample that is generated using computed tomography. The generated model may be used in simulate the injection of fluids into the porous medium. From the DCA a measure of pore-scale heterogeneity may be obtained and correlated to the pore volume to break-through volume for a given stimulating fluid.

Morphological and geometrical statistical property analysis may also be performed to obtain pore-scale heterogeneity information, such as the determination of pore size distribution, local and average tortuosity measurements, grain size distribution. 3D porous solid images, and digital rock model. All of which may be used to provide a detailed description of the types of porosity, pore connectivity, fabric and texture of a porous sample or formation.

In one or more embodiments, once all these parameters are obtained, on multiple cores, it may be possible to collapse multiple PVBT curves for differing rock types of different carbonate rock types into a single curve (as shown in the example here after); indeed, the pore volume may be reduced by the flowing fraction measured numerically from the conducted tracer simulations. The PVBT for different rocks may be recalculated based on the flowing porosity so that the PVBT curves of the carbonate rock types of different magnitude of pore-scale heterogeneity combine into one single curve. The inventors thus believe that determination of PVBT may be used for the design of the matrix stimulation treatments in carbonates. It has to be noted that these successive test are useful for building a numerical model; however, once said numerical model is existing, only the tracer injection simulations may be done by the operator. Indeed, with such tool, an operator can simulate tracer propagation through a core in order to obtain the flowing fraction and then use the prebuilt model to deduce the PVBT and thus design its acidizing job.

The presently disclosed method is non-destructive thus the investment and time required to sample core will be highly reduced. Indeed, samples are scanned with computed tomography, tracer injection tests are simulated numerically. Therefore presented workflow is useful when cores are in short supply, or tests with acids on large blocks cannot be carried out due to safety concerns. The numerical simulations of flow of tracers can be used in predicting the flow of reactive fluids in the rock.

Further embodiments relate to methods for designing acidizing job by predicting reactive flows by DCA simulation of the non-reactive fluid injection through a porous medium, thus measuring the flowing fraction; then, correlating the flowing fraction to the pore volume to breakthrough and then determining the type of acid, its concentration and its injection pressure.

Among the stimulating fluids that may be used to in various embodiments of the present invention are either pure acids for various concentrations, for example hydrochloric acid in a range of 5 to 28 wt percent of concentration, or various stimulation fluid compositions such viscoelastic diverting acids, e.g. HCl and a viscoelastic surfactant, self-diverting acids such as HCl and various polymers, or emulsions like HCl and Diesel mixtures, or alcoholic acids, for example HCl and methanol or isopropyl alcohols. Instead of HCl, these fluids can also be made with organic acids or chelants. Common organic acids in use are: acetic, formic and citric acid. Common chelants are EDTA (ethylenediamine tetraacetic acid) and DEA (diethanolamine). Mixture of acids can also be used.

An operator may be able to validate the flow model on location in some embodiments of the present disclosure by sampling cores of the region prior to treatment, simulating a tracer injection to calculate the flowing fraction; then comparing the obtained results with the numerical model. If significant differences are observed, the numerical model may be updated; if no significant differences are observed, then the stimulation operation may be designed.

Non-Reactive Fluids

In one or more embodiments, the flowing fraction of a porous sample may be estimated by simulating the injection of a non-reactive fluid through the sample model, estimating the residence time distribution of the fluid to quantify the storage geometry of the flow paths, and determining the flowing fraction from the generated data. Models in accordance with the present methods may describe non-reactive fluids that are aqueous fluids, oleaginous fluids, emulsions, gelled fluids, gases, or foams.

In one or more embodiments, the non-reactive fluid may be a non-reactive tracer fluid that is capable of being measure to verify the validity of the modeling data. As used in accordance with this application, a non-reactive tracer fluid is a fluid that may contain an experimentally measurable species that may be used to simulate that flow of a stimulating fluid or other wellbore treatment fluid through a porous medium without damaging the sample or altering its chemical properties.

Non-reactive tracer fluids in accordance with the present disclosure may be an aqueous fluid containing a detectable species such as an ion, isotope, or dye molecule by which an operator may identify when the tracer fluid has passed through sample and measured through a number of analytical techniques including, for example, inductively coupled plasma atomic emission spectroscopy (ICP-AES), gas chromatography, high pressure liquid chromatography, electrochemical detection, Fourier transform infra-red spectroscopy, UV-Vis spectroscopy, and fluorescence spectroscopy.

Examples of non-reactive tracer fluids that may be included in models of the instantly described methods may include ion-containing fluids such as brine containing for example potassium, sodium, lithium, magnesium, calcium, bromides iodides, etc.; fluids containing more complex salts such as nitrate, thiocyanate, fluorobenzoic acids, or hydrogen borates; enriched isotopic fluids such as deuterated or tritiated water; or tracer fluids containing colorimetric or fluorescent dyes such as rhodamine, cyanine dyes, or fluorescein.

In other embodiments, the non-reactive tracer fluids may be a gas injected through a sample such as $N_2$, or $CO_2$, sulfur hexafluoride, freons, deuterated hydrocarbons, noble gases such as He and Ar, perflurocarbons such as perfluorodimethylcyclobutane (PDMCB), perfluoromethylcyclopentane (PMCP), perfluoromethylcyclohexane (PMCH), 1,2- and 1,3-perfluorodimethylcyclohexane (1,2-/1,3-PDMCH). Non-reactive fluids in accordance with the instant disclosure may also include alcohols such as methanol, ethanol, and propanol; and hydrocarbon tracers such as propane, propene, butene, butane, and pentane.

In yet another embodiment, the modeled non-reactive tracer fluids may include naturally occurring components of a target rock or reservoir fluids, including any of the aforementioned ions or detectable species, which is carried out of the sample or formation during the injection of non-reactive tracer fluid. Non-reactive tracer fluids may also include fluids that generate a tracer in situ by the reaction of an injected fluid with rock component or reservoir fluid downhole.

Further, depending on the desired stimulation fluid to be used in subsequent stimulation operations, the modeled non-reactive tracer fluid may be modified to account for the rheological effects of fluids containing emulsifiers or viscosifiers to match the corresponding rheology of the active stimulating fluid. For example, modeled non-reactive fluids simulate fluids emulsified with an appropriate surfactant or mixed with rheology modifiers known in the art such as xanthan gums or polysaccharides. In one or more embodiments, the non-reactive tracer fluid may be an aqueous fluid, an emulsion, an invert emulsion, or a foam.

Stimulating Fluids

Stimulating fluids may be used in accordance with methods disclosed herein to remove or bypass formation damage by creating conductive channels or wormholes through a treated porous medium or formation. In one or more embodiments, prior to the initiation of a wellbore stimulation treatment, an operator may select a target stimulating fluid for a particular porous medium or formation and, on the basis of this selection, conduct preliminary testing on a digital rock model of a porous medium or formation to determine an optimal stimulating fluid for the application.

Once the operator has used the methods of designing stimulating treatments in accordance with the present disclosure, stimulating fluids may be formulated and contacted with the porous medium to be treated, such as by pumping the stimulating fluid into a wellbore to initiate stimulation of an interval of a formation downhole. Formulation and preparation of the constituent materials of the stimulating fluids may be accomplished by methods known in the art of wellbore stimulation.

Stimulating fluids that may be used and modeled in accordance with the present disclosure include acids of various concentrations. In one or more embodiments, suitable acids may include organic acids such as acetic acid, formic acid, citric acid, and the like; and mineral acids such as hydrofluoric acid, hydrochloric acid, hydrobromic acid, and the like. Mixture of acids can also be used in other embodiments. In one or more embodiments, the stimulating fluid may be an acid applied at a concentration that ranges from 5 to 28 percent by weight (wt %). However, one skilled in the art will appreciate this general range may be greater or lower in some embodiments depending on the chemistry of the stimulating fluid used (e.g., greater concentrations may be required for weak acids or chelant-containing stimulating fluids).

The reaction kinetics of the stimulating fluid with the porous medium or formation may be controlled in some embodiments through the injection rate, or through mass transfer by adjusting the concentration stimulating fluids. In other embodiments, the stimulating fluid may contain additional components that modify the rheology of the stimulating fluid or alter the speed of the chemical reaction of components of the stimulating fluid with the formation. In non-limiting embodiments, stimulating fluids may include viscoelastic diverting acids having a stimulating agent and a viscoelastic surfactant; self-diverting stimulating fluids prepared from a stimulating agent and various polymers; emulsified fluids such as a stimulating agent and oleaginous component that forms a second phase, e.g., an acid and hydrocarbon mixture; or alcoholic acids such as a mixture of an acid or other stimulating agent and methanol or isopropyl alcohols.

In another embodiment, chelating agents may function as a stimulating agent in a fluid injected as a fracturing or stimulating fluid. Chelating agents may stimulate a formation by means of sequestering the metal components of the carbonate matrix. Further, because the mechanism of interaction with the carbonate matrix is distinct from acid-based techniques, in some embodiments stimulation may be enhanced at low pH through the combined usage of acid and chelants. Possible chelants suitable for the described methods may include, for example, EDTA (ethylenediamine tetraacetic acid), diethylenetriaminepentaacetic acid (DTPA), citric acid, nitrilotriacetic acid (NTA), ethylene glycol-bis(2-aminoethyl)-N,N,N',N'-tetraacetic acid (EGTA), 1,2-bis(o-aminophenoxy)ethane-N,N,N',N'-tetraacetic acid (BAPTA), cyclohexanediaminetetraacetic acid (CDTA), triethylenetetraaminehexaacetic acid (TTHA), N-(2-Hydroxyethyl)ethylenediamine-N,N',N'-triacetic acid (HEDTA), glutamic-N,N-diacetic acid (GLDA), ethylene-diamine tetra-methylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETPMP), amino tri-methylene phosphonic acid (ATMP), and diethanolamine (DEA).

In one or more embodiments, stimulation fluids in accordance with the present disclosure may also include the use of retarded acids having reduced reactivity such that the acid penetrates deeper into the formation before being spent. In particular embodiments, emulsified acids may be used as a retarded acid source. For example, an acid or other stimulating agent may be contained within the internal phase of an emulsion, preventing contact of the stimulating agent with the formation and allowing delivery of the stimulating agent further into the formation. The external phase acts as a diffusion barrier to reduce the diffusion of the acid droplets to the surface of the rock which helps in the creation of deep wormholes. For example, the reaction rate of 28 wt % HCl emulsified acid with limestone is 8.5 times less than that of 28 wt % HCl with limestone. In embodiments in which the stimulating agent is present within an aqueous phase, the external phase may be a hydrocarbon or other oleaginous phase such as oil or diesel. Other approaches may include the use of stimulation foams, where, similar to the presence of an external phase, the presence of a gaseous phase in the foam acts as a barrier that prevents the stimulating agent species from spreading into the formation.

In some stimulation operations of the present disclosure, a solid acid-precursor can be used as a degradable material in the stimulating fluid. Suitable acid-generating materials can include for example, and without limitation, polylactic acid (PLA), polyglycolic acid (PGA), carboxylic acid, lactide, glycolide, copolymers of PLA or PGA, and the like and combinations thereof. Provided that the formation rock is carbonate, dolomite, sandstone, or otherwise acid reactive, then the hydrolyzed product, a reactive liquid acid, can etch the formation at exposed surfaces. This etching can enlarge the channels and/or remove smaller particles or gel from the interstices between proppant particles and thus further enhance the conductivity of the propped fracture. Other uses of the generated acid fluid can include aiding in the breaking of residual gel, facilitating consolidation of proppant clusters, curing or softening resin coatings and increasing proppant permeability.

In some embodiments of the disclosure, the solids in the treatment fluid may be formed of, or contain, a fluoride source capable of generating hydrofluoric acid upon release of fluorine and adequate protonation. Some non-limiting examples of fluoride sources which are effective for generating hydrofluoric acid include fluoroboric acid, ammonium fluoride, ammonium fluoride, and the like, or any mixtures thereof.

Stimulating fluids and modeled stimulating fluids in accordance with the present disclosure may also include, without limitation, friction reducers, clay stabilizers, biocides, crosslinkers, gas generating agents, breakers, corrosion inhibitors, and/or proppant flowback control additives. The treatment fluid may further include a product formed from degradation, hydrolysis, hydration, chemical reaction, or other process that occur during preparation or operation.

EXAMPLES

In the following example, core samples from two different carbonates were selected. The carbonates were mainly composed of limestone, but each had distinct pore structures.

Carbonate Rock Type Characterization

Core Selection

Two cylindrical cores of 1.5-in. diameter and 6-in. length were drilled from each carbonate rock type. Two carbonate rock types were studied: Pink Desert, and Edwards White. The large blocks were obtained from Edwards Plateau and Kansas formations respectively. The drilled cores were weighed dry and after saturation. Pore volume, and porosity were determined from these measurements. Table 2 lists the properties of the cores for each carbonate rock type used. Selected samples are clean from clays the difference in their response to acid stimulation treatments is because of the difference in their pore structure.

TABLE 2

Core Properties

| Rock Type | Pore Volume ($cm^3$) | Porosity (vol %) | Permeability, mD |
|---|---|---|---|
| Pink Desert | 40-48 | 23-28 | 82 |
| Edwards White | 32-37 | 18-21 | 3 |

Figure 3:
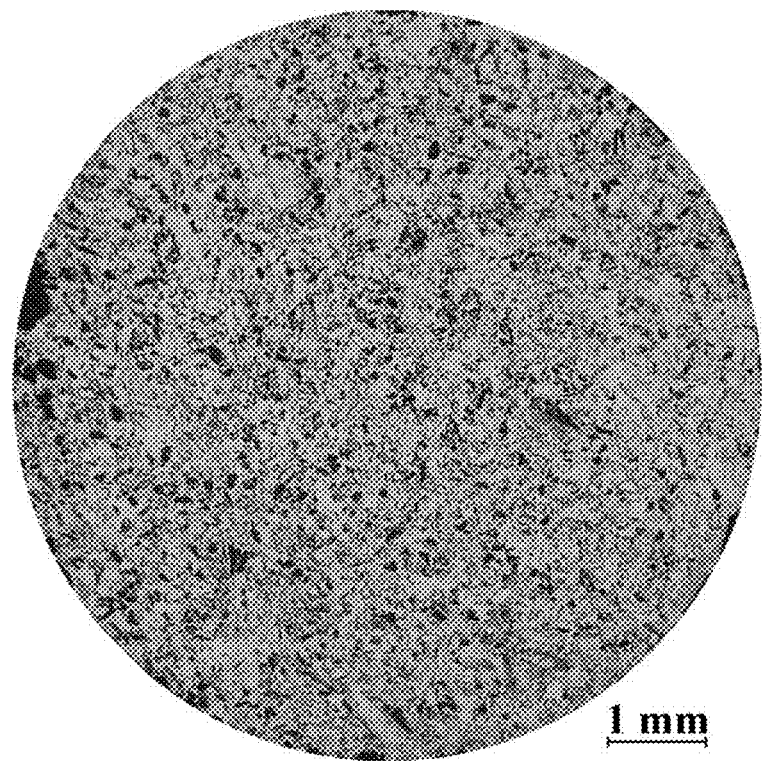
FIG. 3 illustrates an embodiment of the present disclosure in which a 2D slice of Pink Desert is modeled from microCT data.

MicroCT Scanning 8 mm plugs were drilled from cylindrical cores of 1.5-in. diameter and 6-in. length and scanned using X-rays in a microCT machine. The tomographic inversion of the X-ray scans is used to create a static model of a rock with resolution of 2.3 microns. This CT image is processed and segmented into grains and pores. Two digital models were constructed:

Pink Desert: connected porosity (top to bottom and back): 23%. Model size is 2.5×2.5×2 mm as shown in FIG. 3

Figure 4:
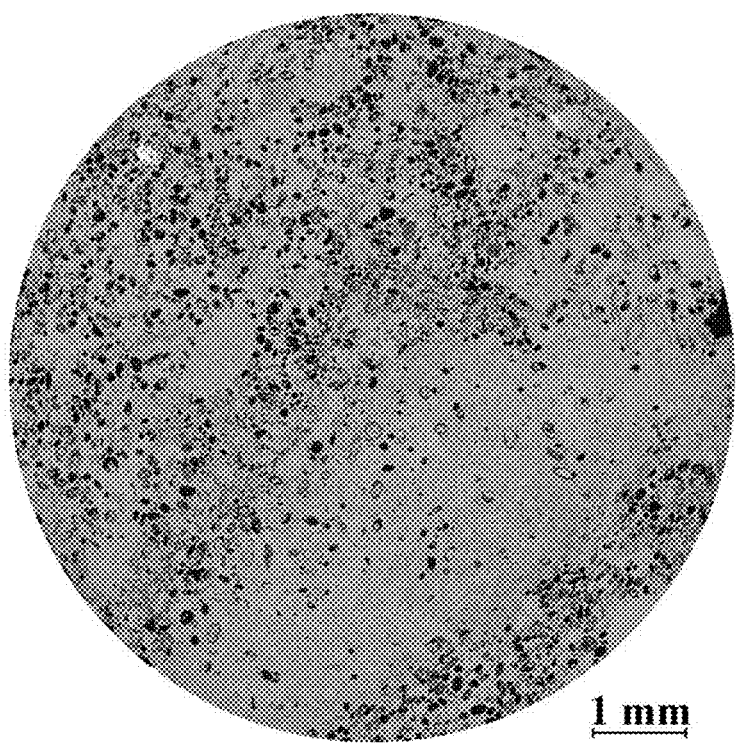
FIG. 4 illustrates an embodiment of the present disclosure in which a 2D slice of Edwards White is modeled from microCT data.

Edwards White: connected porosity (top to bottom and back): 13.7%. Model size is 2.5×2.5×2 mm as shown in FIG. 4

Figure 5:
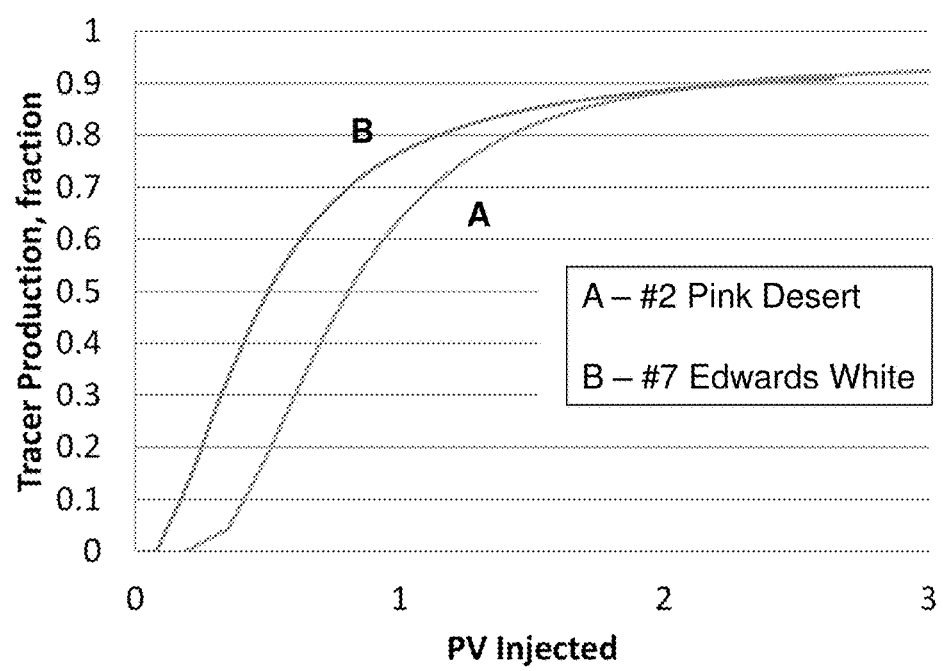
FIG. 5 illustrates an embodiment of the present disclosure in which digital core analysis (DCA) is used to simulate the concentration of non-reactive tracer fluid emerging from modeled rock samples as a function of pore volume (PV) injected.

Tracer Experiments: Digital fluid model of passive tracer solution was used in the DCA simulations. The solution was injected for three pore volumes at the constant injection rate for each digital model. Prior to commencing the non-reactive tracer fluid injection simulations, the core was saturated with water with following properties: Density=1000 kg/m3; Viscosity=1.00 cP. During the simulation composition of the outflow solution was obtained. The tracer concentration at each sample point is plotted versus pore volume injected (FIG. 5).

Results

Thin Sections

Thin section analysis was made for each rock type to examine the pore structure and pore-scale heterogeneities.

Pink Desert is a good example of mixed fossil grainstone that has undergone moldic dissolution followed by calcite cement fill. The pore structure is dominated by moldic porosity and, consequently, is not well connected. Calcite cement fills the primary intergranular pores and some of the moldic porosity.

Edwards White is a good example of a planktonic foraminiferal limestone. It has poorly sorted packstone texture and is predominantly composed of intraclasts, micritized grains, pelecypods, ostracods, ooids and micritized skeletal fragments. Moldic porosity is the dominant pore system by leaching forams with fewer intergranular pores. The limestone had a dominant micritic matrix that fills most of the intergranular pores and some of the moldic pores. Edwards White is characterized by high storage capacity and low permeability.

Tracer DCA Simulations

Figure 8:
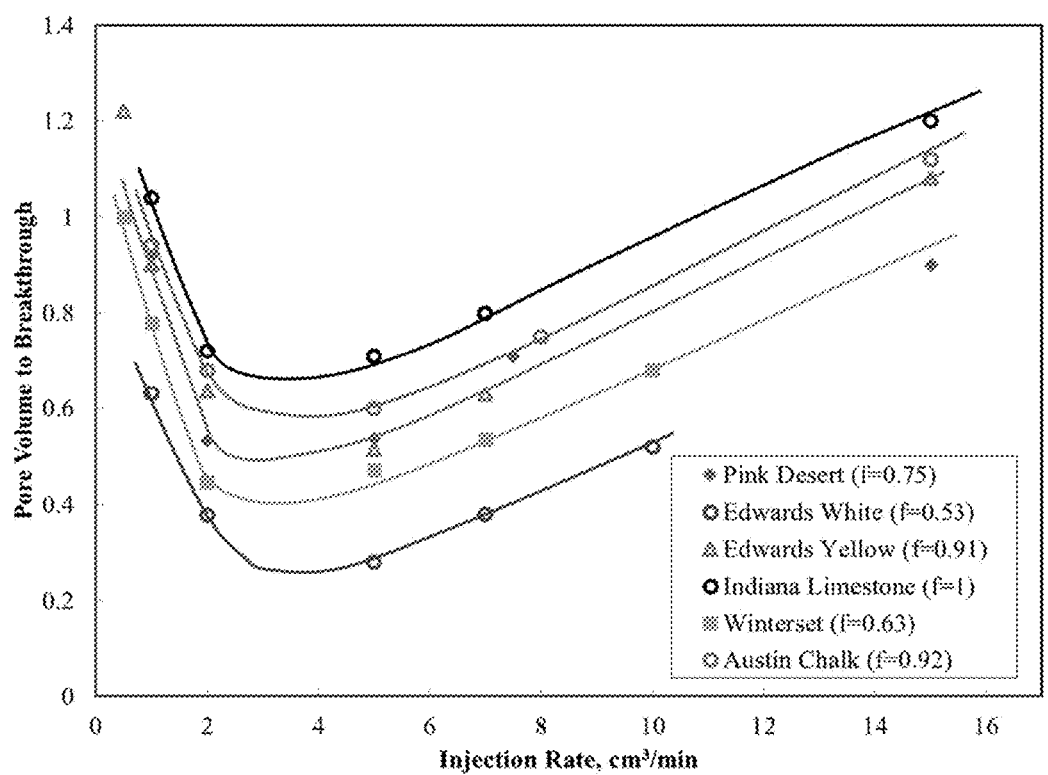
FIG. 8 schematically illustrates pore volume to breakthrough as a function of injection rate for different simulated carbonate rock types.

The normalized tracer concentration ($C/C_0$) in the core effluent samples for different carbonate rock types is plotted as a function of the cumulative pore volume injected (FIG. 8).

Results of DCA were used to describe the flow and storage geometry of flow paths. Flow capacity of a given flow path is defined as the fraction of the total volumetric flow that is associated with that flow path; storage capacity is the fraction of the total PV associated with it. Flow capacity and storage capacity are cumulative distribution functions of the individual flow path properties.

Figure 6:
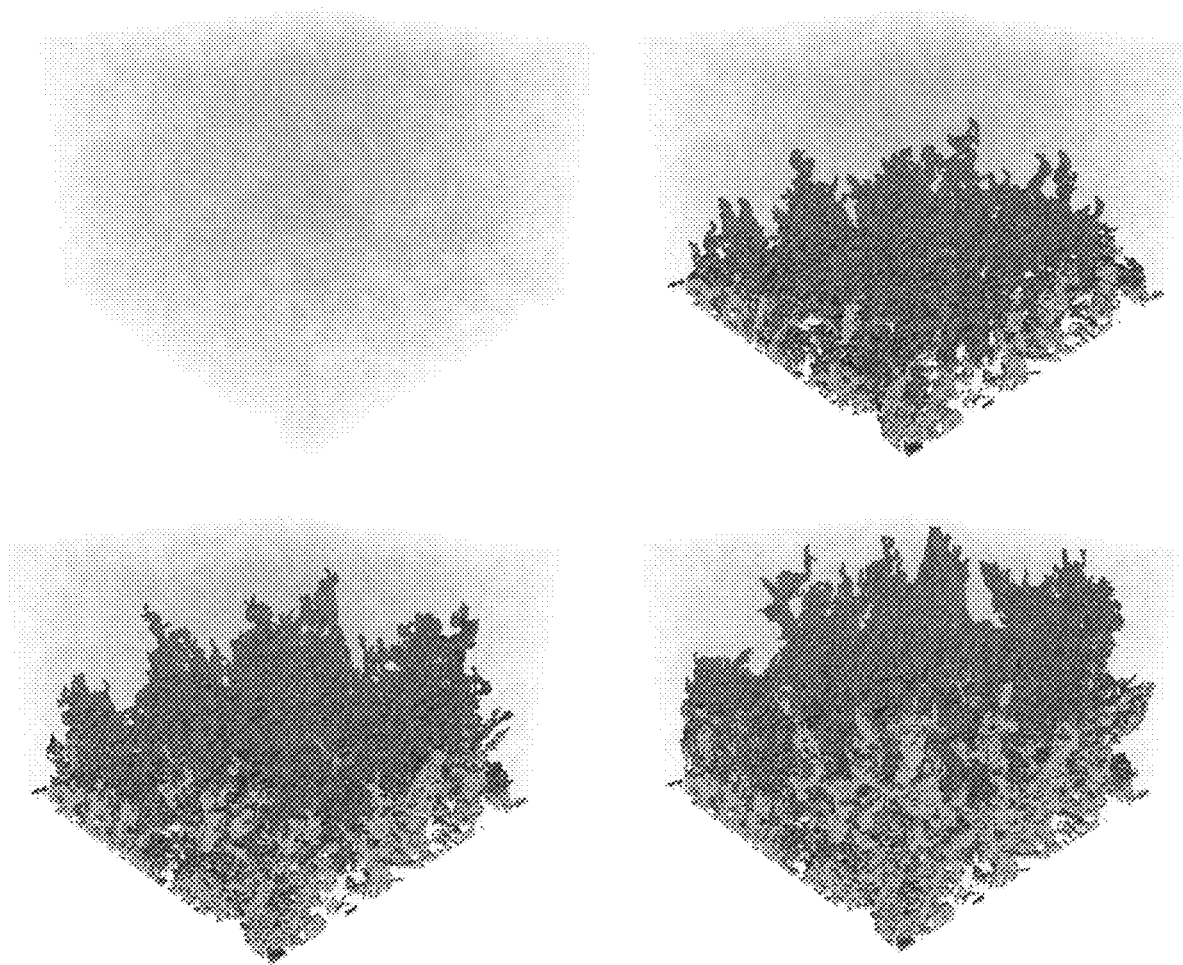
FIG. 6 illustrates a computer model time series in which a simulated sample of Pink Desert rock type generated using DCA that accounts for propagation dynamics, flow-storage capacity, and travel path distributions of injected fluids is injected with a non-reactive tracer fluid (where the tracer solution is represented as the advancing darker gray color).
Figure 7:
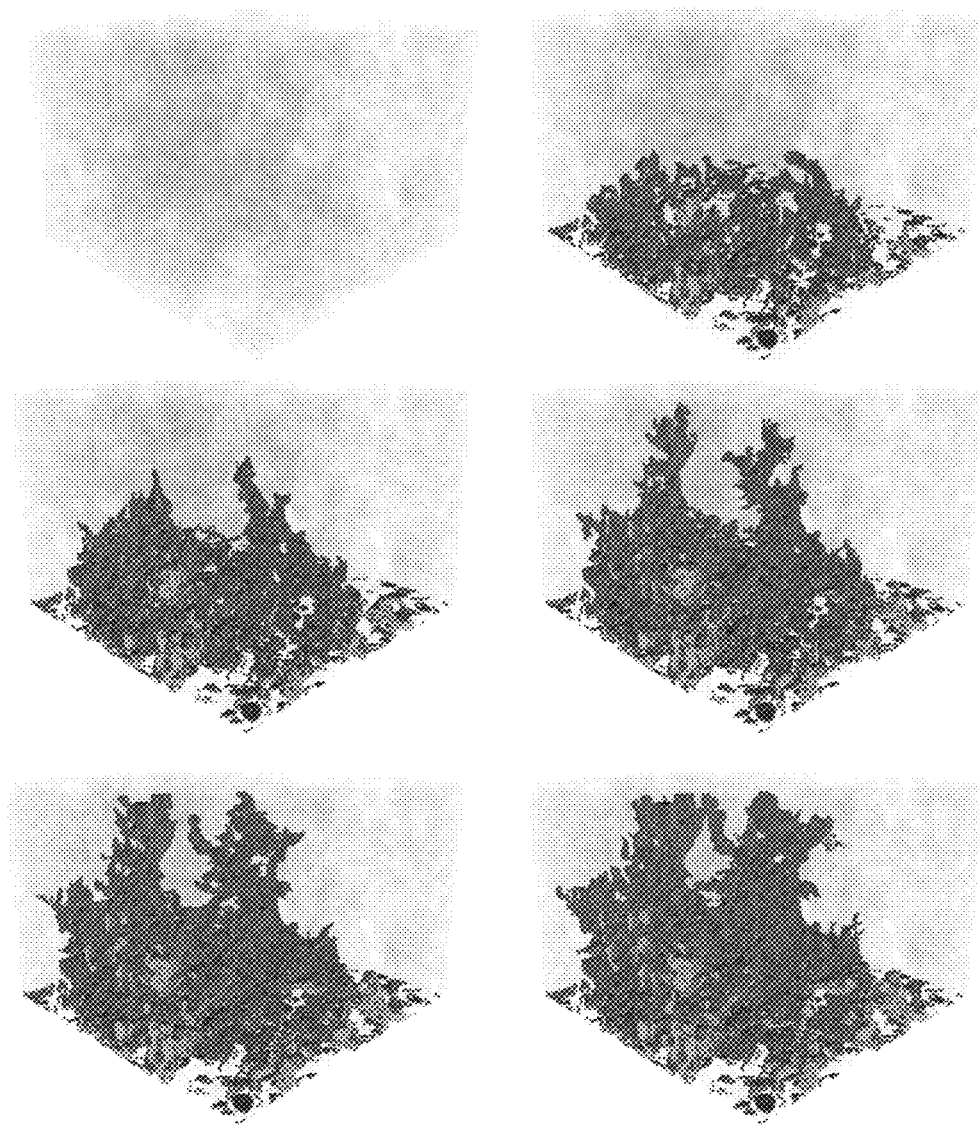
FIG. 7 illustrates a computer model time series in which a simulated sample of Edwards White rock type generated using DCA that accounts for propagation dynamics, flow-storage capacity, and travel path distributions of injected fluids is injected with a non-reactive tracer fluid (where the tracer solution is represented as the advancing darker gray color).

An example flow-storage capacity and travel path distribution can be directly obtained from the DCA simulation results as presented on FIG. 6 (Pink Desert) and FIG. 7 (Edwards White) where the tracer is shown as a dark gray color being injected from the lower portion of the figure, while the remaining fluid is light gray. For the carbonate rock types, where the porosity is not well connected, a heterogeneous flow path distribution exists. For example, for Edwards white, 70% of the flow is coming from only 35% of the PV—an indication of low pore volume contacted by the invading tracer.

Quantification of the Magnitude of Pore-Scale Heterogeneity

The pore-scale heterogeneity may be described as a measure of the fluctuation in pore connectivity, variation of porosity types, diversity in the size and shape of pores, and changes in the rock fabric and texture. While thin sections may provide a qualitative measure of the pore-scale heterogeneity, a quantitative measure of pore-scale heterogeneity may be useful when correlated to pore volume to breakthrough and the porosity-permeability relationship.

To this end, it is believed that pore connectivity, size and shape, rock fabric, and amount of cement strongly affect the flowing fraction of the pore structure measured from the for a given sample. As discussed above, the pore-scale heterogeneity is inversely related to the flowing fraction, and as the flowing fraction increases (indicating a homogenous pore structure), the pore-scale heterogeneity decreases. Thus, in one or more embodiments, the flowing fraction derived from numerical DCA simulations of a tracer injected through the carbonate rock models, may be a practical way to quantify the pore-scale heterogeneity in carbonate rocks.

Calculating the Flowing Fraction Through Numerical Modeling

In this approach, the flowing fraction is defined as the cumulative pore volume injected corresponding to the normalized tracer concentration of $C/C_0=0.5$. In other words, this approach depends on how much the tracer concentration profile for the carbonate rock type deviates from the symmetrical profile around 1 PV injected. It was found that the flowing fraction estimated from the DCA simulations of tracer injection may be used to quantify the magnitude of pore-scale heterogeneity (this finding will be discussed in details in the next section). Table 3 below shows the flowing fraction for the carbonate rock types used.

TABLE 4

| Flowing Fraction for Different Rock Types | |
|---|---|
| Rock Type | Flowing fraction (f) |
| Pink Desert | 0.75 |
| Edwards White | 0.52 |

Use of Tracer DCA Simulations to Predict PVBT

FIG. 8 shows the effect of the observed flowing fraction on the pore volume to breakthrough (PVBT) for a 15% solution of hydrochloric acid at different injection rates and at 150° F. (66° C.). For carbonate rock types of higher magnitude of pore-scale heterogeneity, the acid dissolves less rock overall than when compared to rock of low magnitude heterogeneity, such as Indiana limestone rock type (f=1), which leads to a lower PVBT. For example, the acid pore volumes to breakthrough for Edwards White carbonate rock type (f=0.53), ranging from 0.6 to 0.38, were observed to be less compared to Indiana limestone carbonate rock type (f=1) with PVBT ranging from 1.4 to 0.82. Acid pore volume to breakthrough is influenced by how fast the wormhole propagates along the rock. Consequently, wormhole propagation may occur more rapidly in carbonate rocks of higher magnitude of pore-scale heterogeneity when compared to rocks of lower magnitude such as Indiana limestone (f=1).

In one or more embodiments, DCA simulations of tracer propagation may substitute for at least one experimental test used to determine pore-scale heterogeneity. These simulations may provide measurements of the tracer flowing fraction. DCA simulations of tracer propagation show that the pore volume to breakthrough decreases with the increase of the magnitude of the pore-scale heterogeneity. The slope of the pore volume to breakthrough-flowing fraction relationship is independent on the injection rate.

By use of microstructural analysis and tracer DCA simulation results, one can understand the early acid breakthrough in some carbonate rock types when compared to others. For samples with well-connected intergranular porosity the tracer concentration profile shows a high flowing fraction near unity.

The carbonate rock types with a low flowing fraction may exhibit a PVBT that is much lower than predicted using the total porosity, and, in effect, the movement of fluids and formation of wormholes may occur at greater velocities than carbonate rock types with high flowing fraction.

To collapse the acid PVBT curves of different carbonate rock types into one single curve, the pore volume may be adjusted by reducing the flowing fraction measured from the conducted DCA tracer propagation simulations (Table 3). The PVBT for different rocks can be recalculated based on the effective pore volume so that the PVBT curves of the carbonate rock types of different flowing fraction combine into a single curve.

Figure 9:
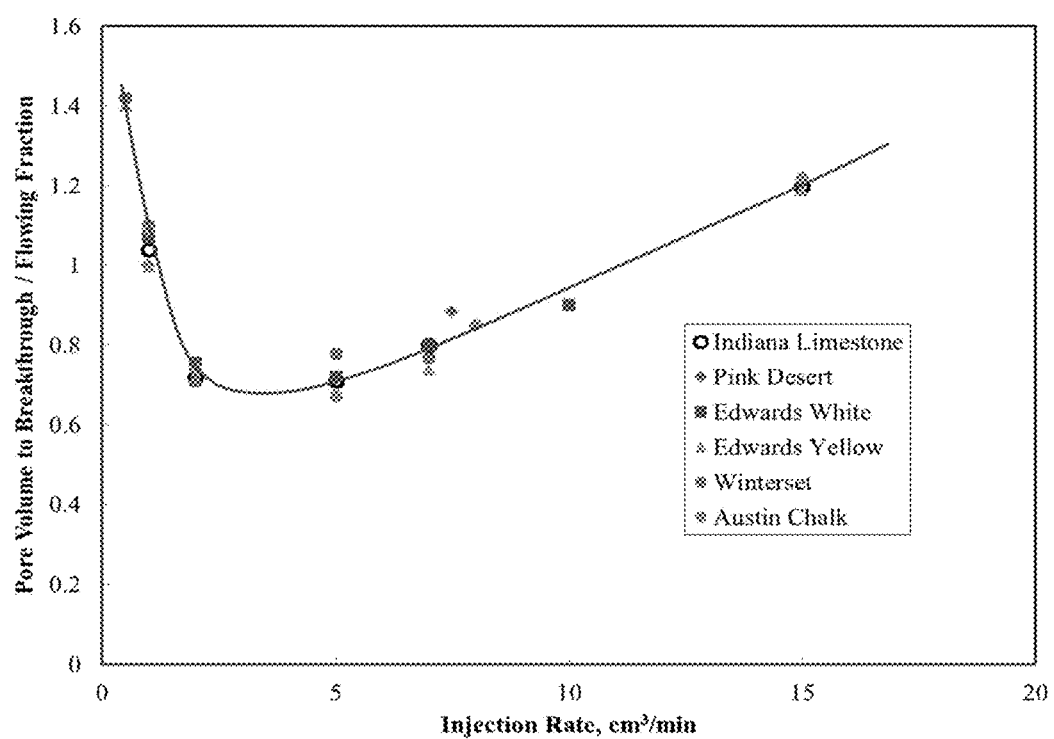
FIG. 9 schematically illustrates an embodiment of the present disclosure in which a pore volume to breakthrough curve for different simulated carbonate rock types is generated by collapsing (or normalizing) the curves according to the respective flowing fraction of each rock type.

To collapse the acid PVBT curves of different carbonate rock types into one single curve, the pore volume was adjusted by reducing the flowing fraction to correlate with that measured experimentally from the non-reactive tracer tests (Table 3). As a an example, the PVBT for different rocks shown in FIG. 8 were recalculated based on the flowing fraction and aligned on the single curve as show on FIG. 9.

Once the acid PVBT curves of the varied carbonate rock types are collapsed into a single acid PVBT curve, the effect of pore-scale heterogeneity on carbonate stimulation treatments may be correlated with the measured flowing fraction. The results may be useful in the design of the matrix stimulation treatments in carbonates by allowing operators to increase the accuracy of estimates for injection pressure and stimulating fluid concentration for a calibrated rock type.

Processing results reveal a single curve for a wide range of carbonate rock types. This master curve may provide a means of estimating the entire pore volume to breakthrough curve from a single non-destructive tracer propagation DCA simulation to quantify the pore-scale heterogeneity of the rock (by calculating the flowing fraction for example). Thus, this master curve eliminates the need for extensive and repetitive coreflood experimentation to determine the PVBT curve for the reservoir carbonate rock. This approach will highly reduce the cost and the time required to sample reservoir cores to perform repetitive and routine experiments. Also, such techniques may be useful when cores are in short supply or when acid experiments cannot be carried out on large blocks as these experiments are prohibitively expensive.

Large-scale heterogeneities such as fractures, permeability variation, and laminations may be accounted in matrix acidizing models by a reasonable gridding scheme. As discussed above, the pore-scale heterogeneity may have a significant effect on the carbonate stimulation treatments. To account for pore-scale heterogeneity, a gridding scheme finer than the pore scale may need to be employed.

The approach presented in this disclosure could be used to account for such heterogeneity in matrix acidizing models. In such models, the pore volume of each grid may be reduced by the flowing fraction measured numerically from DCA that simulates the flow a non-reactive tracer fluid within a core samples being stimulated In other words, the flowing fraction should be used in the models rather than the effective porosity so that the effect of pore-scale heterogeneity is accounted for.

Experimentally, coreflood experiments on long reservoir cores may be useful in designing and predicting the success of wellbore stimulation treatments. However, such techniques may not be practical in every instance. Instead, coreflood experiments may be performed on analogs for carbonate reservoirs as a substitute in some instances. It is expected that analog carbonate from formation outcrops will exhibit similar magnitudes of pore-scale heterogeneity and, in effect, exhibit similar properties during stimulation treatments. Consequently, the acid response to carbonate reservoirs may be predicted by knowing the flowing fraction measured experimentally from tracer tests performed on carbonates analogous to those in a given reservoir.

In one or more embodiments, the present disclosure is directed to developing models describing the flow of fluids through a porous medium that may have utility in designing stimulation treatments for subterranean formations. For example, models developed in accordance with the present disclosure may be used to aid matrix stimulation treatments that enhance hydrocarbon recovery for subsequent production operations.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. In the claims, means-plus-function clauses are intended to cover the structures described herein as performing the recited function and not only structural equivalents, but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method, comprising:
   preparing a computer model of a porous medium;
   simulating, in the computer model, an injection of a fluid of the porous medium;
   obtaining a pore-scale heterogeneity of the computer model of the porous medium;
   determining a flowing fraction from the obtained pore-scale heterogeneity;
   designing a stimulating fluid treatment for the porous medium based on the determined flowing fraction;
   formulating and preparing a stimulating fluid based on the design; and
   pumping the stimulating fluid into a wellbore to initiate stimulation of an interval of a formation downhole.

2. The method of claim 1, wherein the flowing fraction is correlated to the pore volume to breakthrough by a computerized calculation.

3. The method of claim 1, wherein the computer model of a porous medium is prepared from a sample of a porous medium.

4. The method of claim 3, wherein the sample of the porous medium is a core taken from a formation.

5. The method of claim 3, wherein the method is non-destructive for the core.

6. The method of claim 1, wherein the simulated fluid injected in the computer model is a simulation of a non-reactive fluid.

7. The method of claim 1, wherein preparing a computer model comprises developing the model from at least one of microCT data, NMR data, and a well log.

8. The method of claim 1, wherein the porous medium is an exposed well in a rock mass, and wherein preparing a computer model of the exposed well comprises measuring the well at several points and/or running a continuous log through the exposed well in the rock mass.

9. The method of claim 1, wherein the porous medium is an exposed well in a rock mass, and wherein preparing a computer model of the exposed well comprises at least one selected from a group consisting of measuring a T2 response from a sample by NMR, collecting a log of the porous medium using an NMR tool, collecting a log of the porous medium using a formation micro-imager, collecting a micro CT scan of a sample, collecting a micro CT log of a well, and imaging using a scanning electron microscope.

10. A method comprising:
    obtaining a sample from a formation to be treated;
    preparing a computer model of the sample;
    simulating, in the computer model, the injection of a fluid into the sample;
    measuring the pore-scale heterogeneity of the sample;
    using the measured pore-scale heterogeneity to derive a flowing fraction for the sample;
    estimating a pore volume to breakthrough for the sample;
    designing a stimulating fluid treatment for the formation based on the results obtained from the determination of the pore-scale heterogeneity
    formulating and preparing a stimulating fluid based on the design; and
    pumping the stimulating fluid into a wellbore to initiate stimulation of an interval of a formation downhole.

11. The method of claim 10, further comprising using a computer to correlate the flowing fraction to the pore volume to breakthrough.

12. The method of claim 10, wherein the method is non-destructive for the sample.

13. The method of claim 10, further comprising analyzing the mineralogy of the sample using x-ray fluorescence measurements.

14. The method of claim 10, wherein designing the stimulating fluid treatment comprises determining at least one of selecting a stimulating fluid, selecting a concentration of a stimulating fluid, and selecting an injection pressure of the stimulating fluid.

15. The method of claim 10, wherein the injection of a fluid into in the computer model of the sample comprises the simulated injection of a non-reactive fluid.

16. The method of claim 15, wherein the non-reactive fluid is selected from at least one of an aqueous fluid, a gelled fluid, an emulsion, an invert emulsion, or a foam.

17. The method of claim 10, wherein simulating the injection of a fluid comprises simulating the injection of a stimulating fluid.

18. The method of claim 17, wherein the stimulating fluid is selected from at least one of an aqueous fluid, a gelled fluid, an emulsion, an invert emulsion, or a foam.

* * * * *